Figure 1:
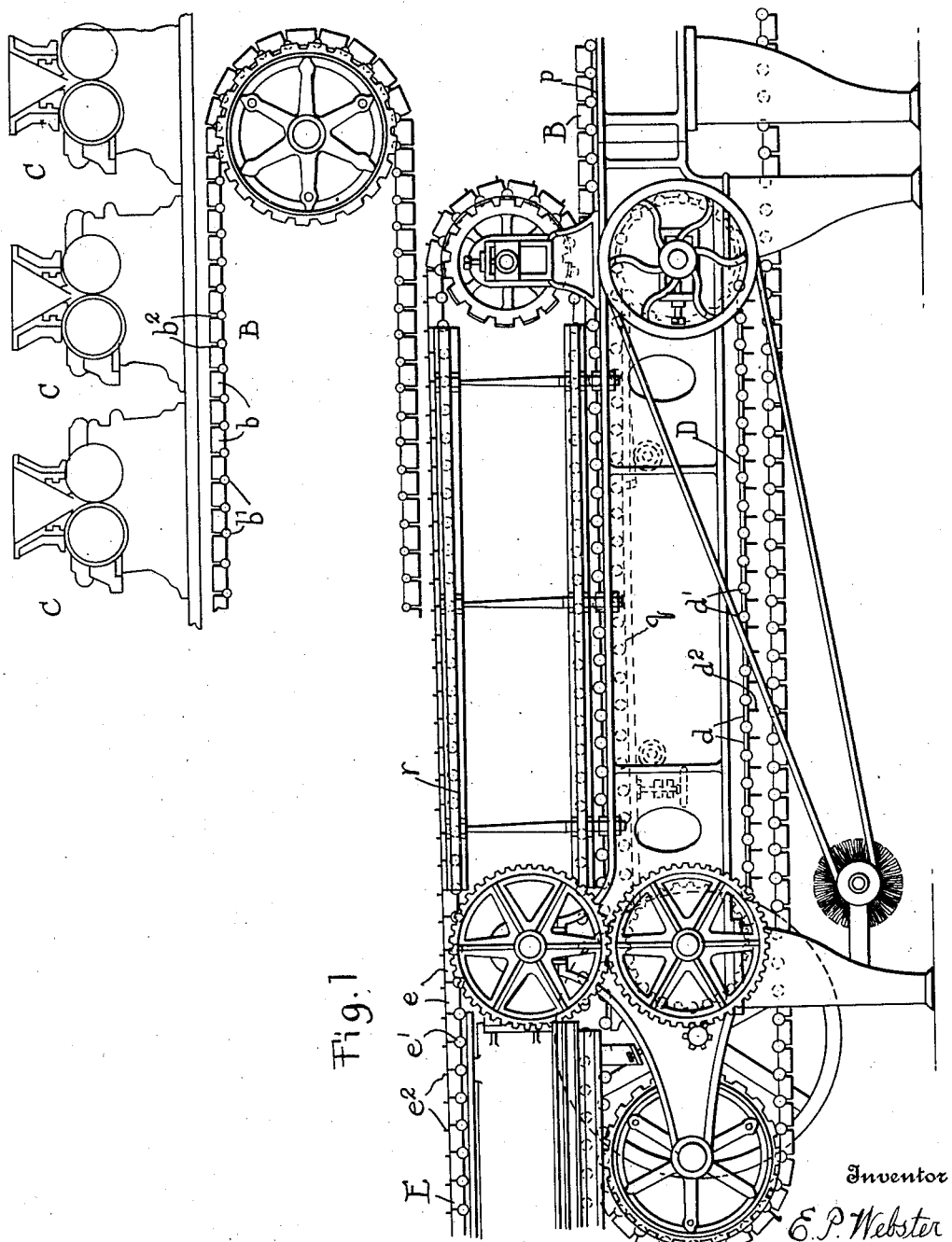

July 13, 1926.  1,592,797

E. P. WEBSTER
BISCUIT DEPOSITING MEANS
Filed March 11, 1925    4 Sheets-Sheet 4

Inventor
E. P. Webster.
E. W. Anderson

By
Attorney

Patented July 13, 1926.

1,592,797

UNITED STATES PATENT OFFICE.

EARL P. WEBSTER, OF NIAGARA FALLS, NEW YORK, ASSIGNOR TO THE SHREDDED WHEAT COMPANY, OF NIAGARA FALLS, NEW YORK, A CORPORATION OF NEW YORK.

BISCUIT-DEPOSITING MEANS.

Application filed March 11, 1925. Serial No. 14,727.

This invention relates to the manufacture of food products by automatic machines in which the products are continuously formed by suitable devices, deposited on a conveyor and carried through a baking oven. The present invention has to do more particularly with the mechanism by which the uncooked products are deposited on the conveyor, and affords means for adjusting the depositing means so that the products will be properly centralized and positioned in the receptacles on the conveyor in which they are to be baked. For purposes of illustration, the device of the present invention will be described in connection with mechanism used in the manufacture of cereal biscuits of the shredded wheat type, but it is to be understood that its utility is not limited to any particular product.

In the manufacture of shredded wheat biscuits, the cereal grain is shredded by suitable devices and deposited in the form of a continuous strand upon a conveyor. The strand, while being conveyed, is subdivided into individual biscuits which are carried to a position above the pans of the baking conveyor and then discharged in transverse rows upon the pans. The transfer of the biscuits from the strand conveyor to the pans may be accomplished by means of an endless chain having hollow links, these links being brought into contact with the upper surfaces of the biscuits on the strand conveyor and suction applied to remove the biscuits from the strand conveyor and carry them along in position on the surfaces of the hollow links. The chain extends out over the baking conveyor and as each pan is brought to rest beneath it, a row of biscuits held against the links is carried out over the pan; then all the links are shut off from the vacuum and the row of biscuits dropped upon the pan.

The mechanism for effecting the transfer includes a suction chamber lying above the hollow links and a plurality of valve plates are used to control the vacuum. These plates are moved successively to place the chamber in communication with the links as the latter move along the chamber until the time for deposition occurs, when all the plates are moved to closed position simultaneously. In order to insure that the row of biscuits is properly centralized in the pan, mechanism is included to move the plates and their actuating devices to different positions of adjustment relative to the chamber and the present invention has to do with improved adjusting means for the purpose. A depositing device of the general type but without the improvement, is illustrated in Patent No. 678,625, issued July 16, 1901, to H. D. Perky, and this invention permits the utilization of the Perky device in connection with a baking conveyor having a series of pans to be filled successively.

Figure 2:
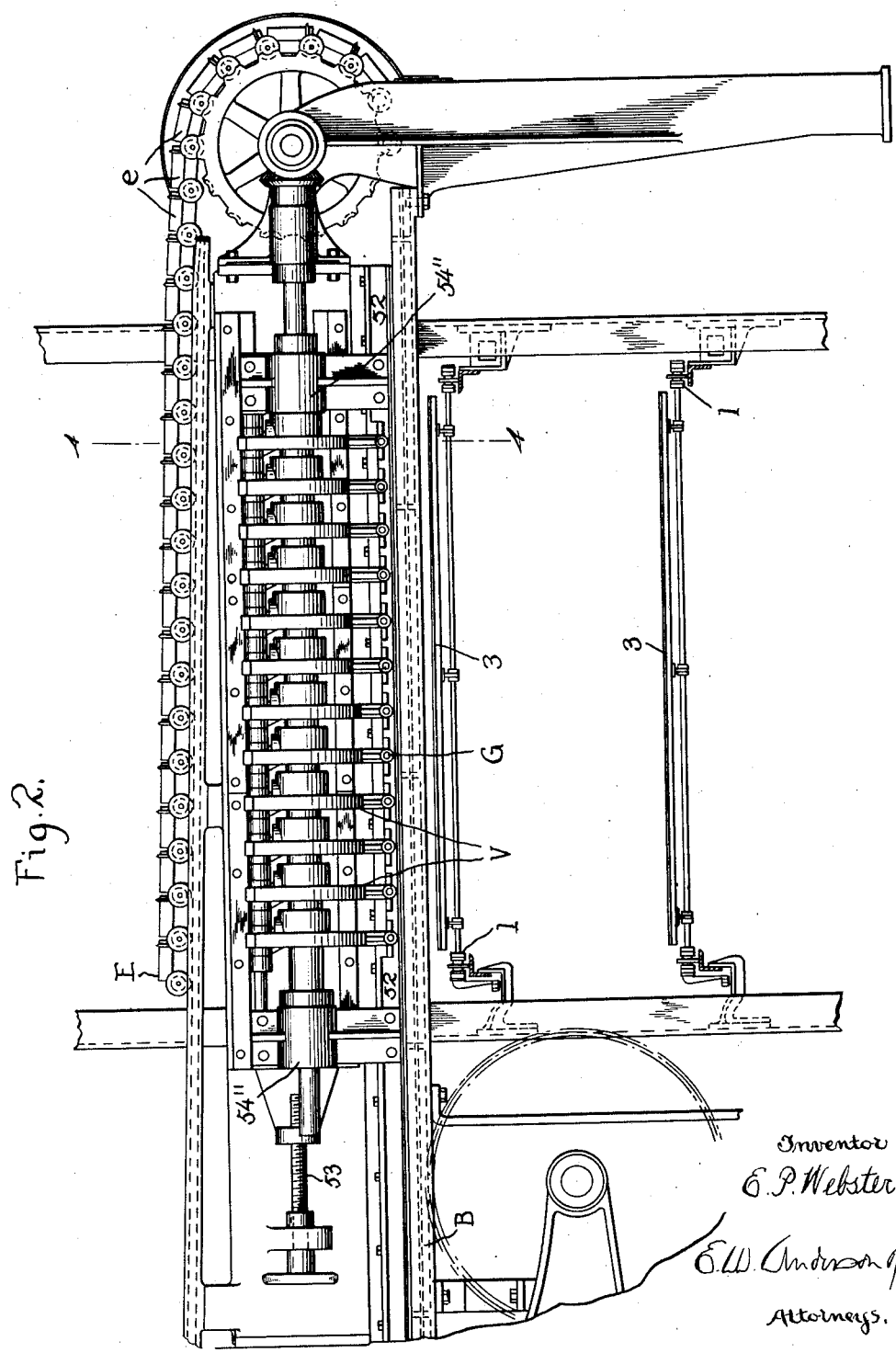
Figure 3:
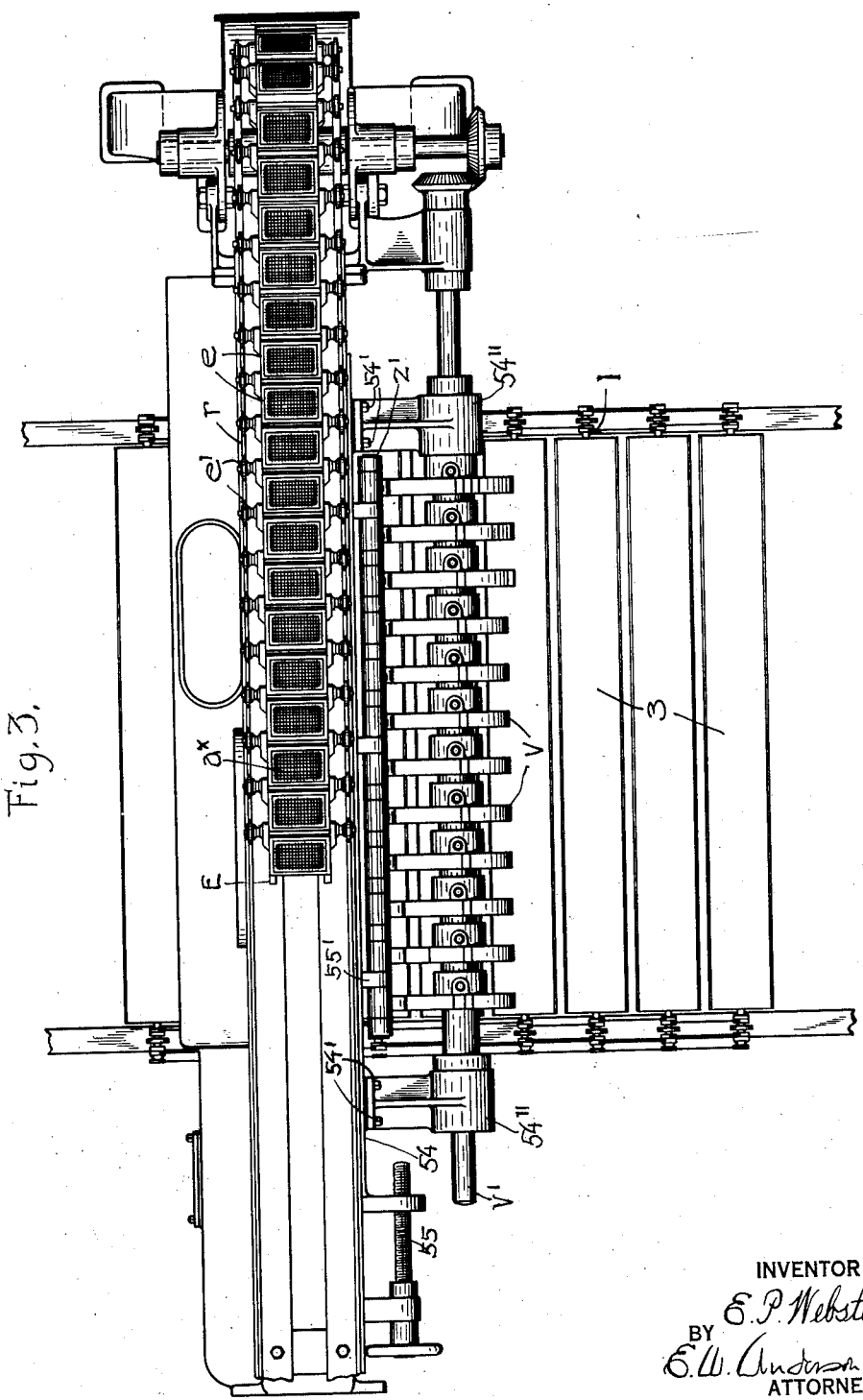
Figure 4:
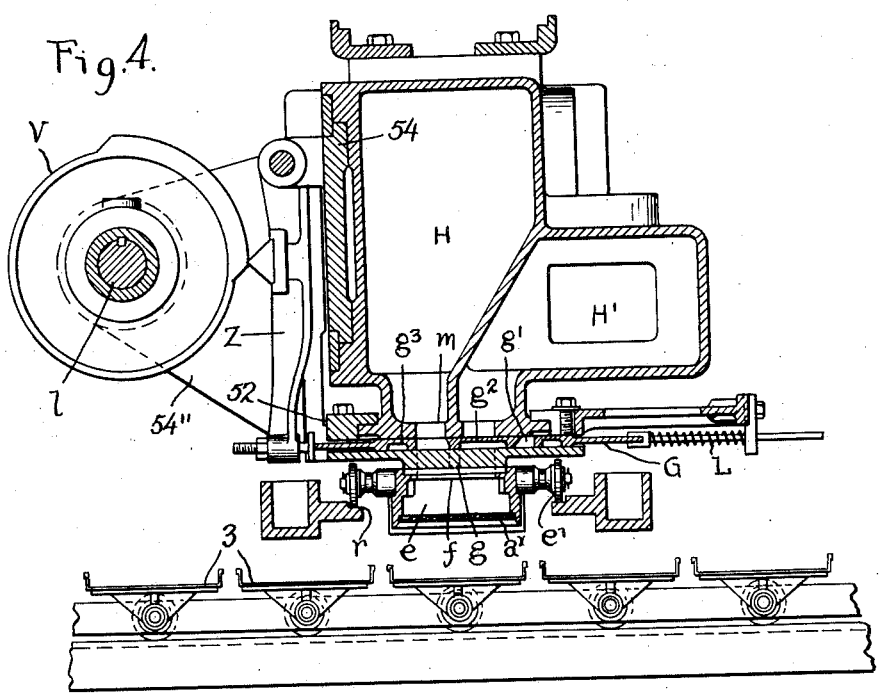
Figure 5:
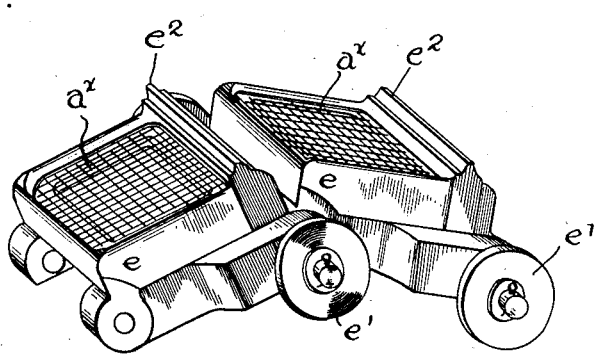

For a better understanding of the invention, reference will be made to the accompanying drawings, in which Fig. 1 is a side view of the shredding devices, the strand conveyor, and the cutter mechanism, Fig. 2 is a complementary side view from the opposite side, showing the means for depositing the biscuits upon the baking conveyor, Fig. 3 is a plan view of the depositing mechanism, Fig. 4 is a transverse view on the line 4—4 of Fig. 2, and, Fig. 5 is a detail in perspective of a pair of links of the cutter chain.

Referring now to the drawings, the baking conveyor B is shown as made up of links $b$ connected by pivots $b'$, these links being spaced apart as indicated at $b^2$. This strand conveyor B is endless and at one point passes beneath a plurality of shredding devices C, which continuously form a cereal strand and discharge it upon the conveyor B. The conveyor B runs on a track $p$ and at one point in its travel, passes between upper and lower cutter chains E and D. The chain E is made up of links $e$ connected by pivots $e'$, these links being provided with cutter blades $e^2$, and this chain runs over a track $r$ in its upper stretch. In its lower stretch its links lie in contact with the strand on the conveyor B. The second cutter chain D lies within the loop of the strand conveyor, and it is made up of links $d$ connected by pivots $d'$, these links having cutter blades $d^2$ which are arranged to cooperate with the cutter blades $e^2$. The upper horizontal stretch of the cutter chain D rides over a track $q$ in close proximity to the under side of the links of the chain B. The cutter chains are arranged so as to pass through the spaces $b^2$ of the strand conveyor chain, and the blades divide the strand into individual biscuits.

The upper cutter chain extends at one end a considerable distance beyond the end of the strand conveyor, and this end overlies a baking conveyor 1, provided with transverse pans 3. In this extension of the chain is a housing provided with a vacuum chamber H and a compression chamber H'. The lower walls of both chambers have slots $m$ which lie close to the rear surfaces of the links $e$ of the upper cutter chain. These links are hollow and have openings $f$ in the rear walls through which the interior of the links may be placed in communication with the chamber H or H'. The faces of the links are closed by screens $ax$, and the chain runs on tracks $r$ which hold the links in close proximity to the walls of the chambers.

Mounted in a slide 52 beneath the chambers H, H' are valve plates G, these plates moving in seats $g^3$. The valves have openings such as $g'$, separated by blank spaces $g^2$, and may be moved so that one or the other of the chambers H, H' is cut off from the links $e$ while the other is in communication with the links. The valve seats $g$ assist in guiding the valve plates in their movement. Each plate carries an extension $l$ surrounded by a spring which bears at one end against the plate and at the other against an extension from the slide 52. Each plate also has a part which may be acted on by a rocker arm Z mounted for swinging movement on a slide 54, and rotary cams V on a shaft V' driven from a suitable source of power, actuate the arms Z and serve to move the plates to place one or the other of the chambers H, H' in communication with the links at the desired instant. As the biscuits reach the end of the strand conveyor, the first valve plate in the series is moved to open the suction chamber and this biscuit is picked up and held against the under surface of a link $e$. As the link moves beneath the next plate, this plate is moved so that as the operation progresses a succession of biscuits, each of which is held against a link $e$ by suction, is continuously moved out over a pan 3. When the row of biscuits is sufficient to fill the pan, all the valve plates are moved simultaneously to shut off the vacuum chamber from the links and connect the pressure chamber thereto. This substitution of pressure for vacuum causes the row of biscuits to be deposited on the pan.

In order to adjust the mechanism so that the biscuits may be properly centralized in the pans, a single adjusting device is provided by which the entire series of valve plates and the entire series of operating cams and arms may be adjusted lengthwise of the chambers so that the deposition of biscuits will occur at the right instant to centralize these biscuits with reference to the pans 3. For this purpose, the slide 54 is provided with an adjustment screw 55 and the slide has bolted thereto at 54' a bracket 54'' which carries the shaft V' on which the cams are mounted. The shaft Z', on which the rocker arms are mounted, is similarly supported on lugs 55' of the slide. A slide 52 which carries the valve plates G, is secured to the slide 54 by means of the end brackets 54'' which extend downwardly to the slide 52 and are bolted thereto. With this arrangement consequently, the operation of the single adjustment screw permits all the valve plates and their operating devices to be moved to different positions lengthwise of the chamber H, H', and thus by a single adjusting means the centering of the row of biscuits in the pans is readily secured.

I claim:—

1. Mechanism for depositing biscuits which comprises a conveyor for carrying biscuits, a second conveyor movable at an angle to the first, and means for depositing successive groups of biscuits upon the second conveyor from the first, this means including a suction chamber overlying a stretch of the first conveyor and having openings, a series of valve plates controlling the openings, a series of operating devices for the plates, and means for simultaneously adjusting the entire series of plates and their operating devices relative to the second conveyor to centralize the groups of biscuits deposited on the second conveyor.

2. In mechanism for depositing biscuits, a conveyor, a second conveyor, means for depositing successive transverse rows of biscuit upon said second conveyor from the first named conveyor including a suction chamber overlying the lower stretch of said first named conveyor and having openings, a slide, a series of valve plates carried thereby and controlling said openings, a second slide, and a series of operating arms and cam devices for said valve plates carried thereby, and means for adjusting simultaneously the entire series of valve plates and the entire series of operating arms and cam devices relative to the said second conveyor, to centralize the deposit of the biscuit rows thereon including means of connection for said slides and a single adjustment device only connected to one of said slides.

3. In mechanism for depositing biscuits, a conveyor carrying a succession of biscuits, a second conveyor for receiving groups of biscuits, the two conveyors extending at an angle with the lower stretch of the first conveyor lying in proximity to the upper stretch of the second conveyor, a suction chamber overlying the lower stretch of the first conveyor and having openings through which the links of the conveyor are in communication with the interior of the chamber, a series of valve plates controlling these openings, a series of operating devices for the valve plates, and means for simultaneously adjusting the position of all the plates and all the operating devices therefor with reference to the second conveyor to centralize the groups of biscuits deposited thereon.

In testimony whereof I affix my signature.

EARL P. WEBSTER.